Patented Aug. 29, 1944

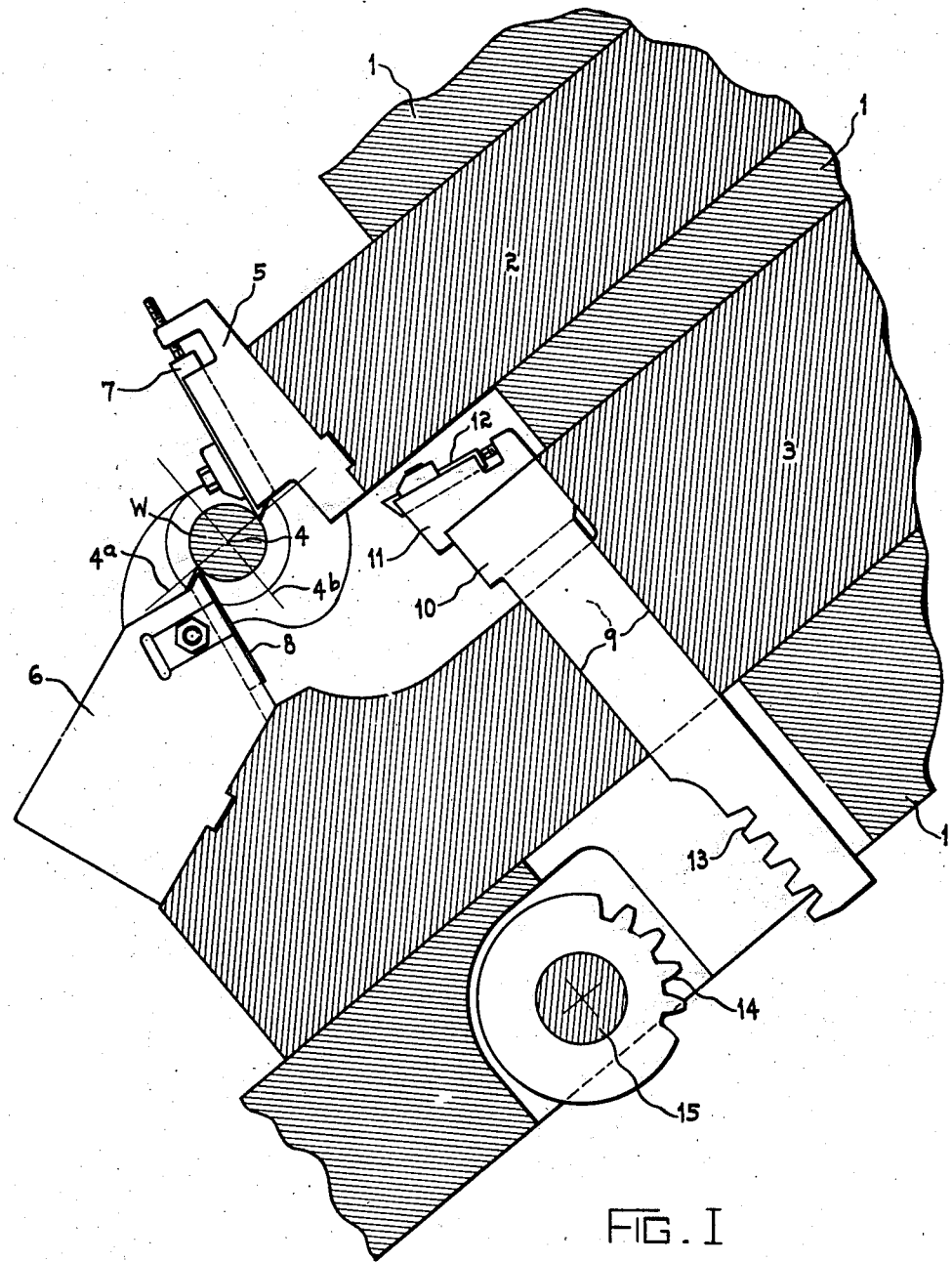
FIG. I

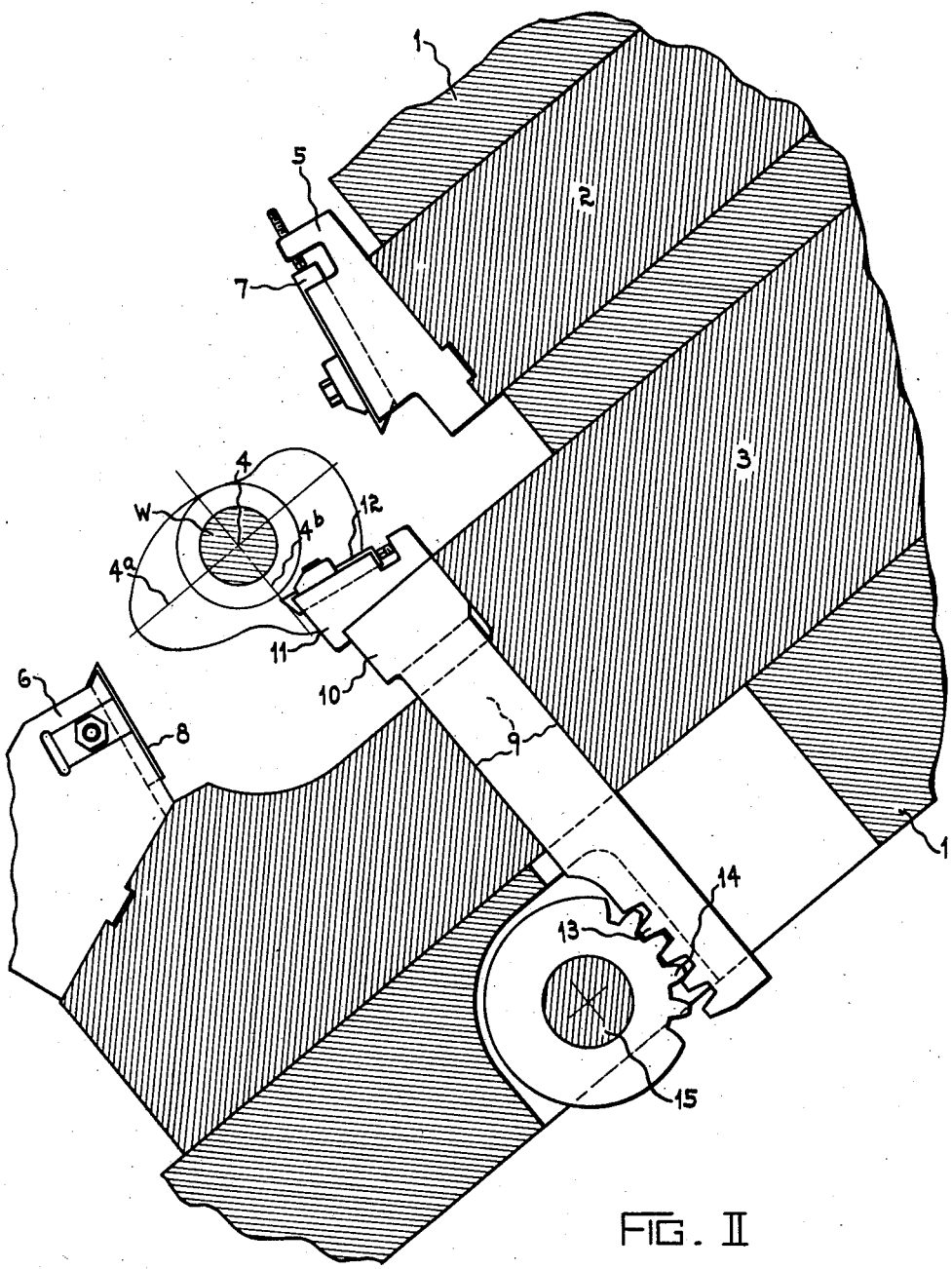
FIG. II

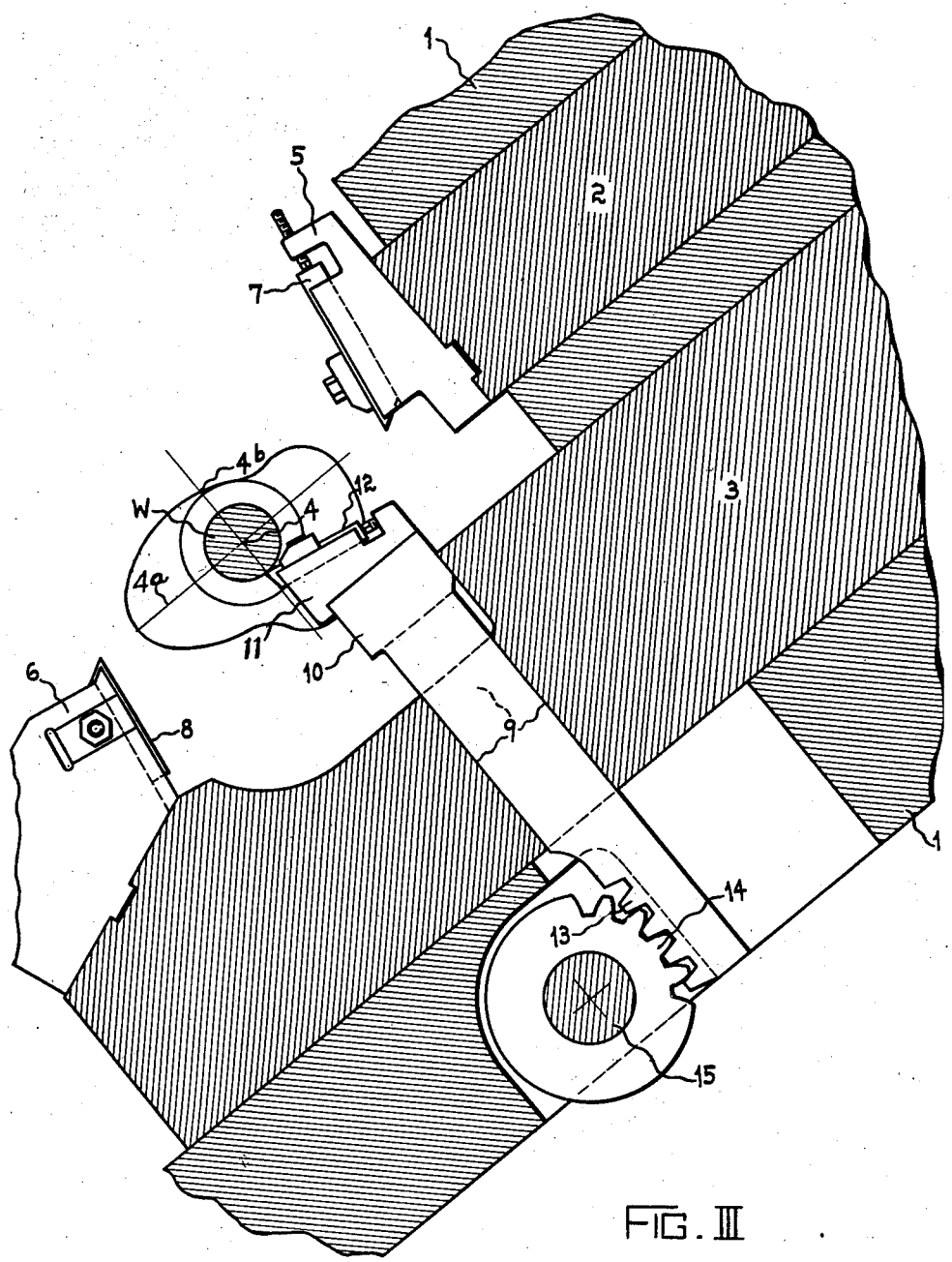
FIG. III

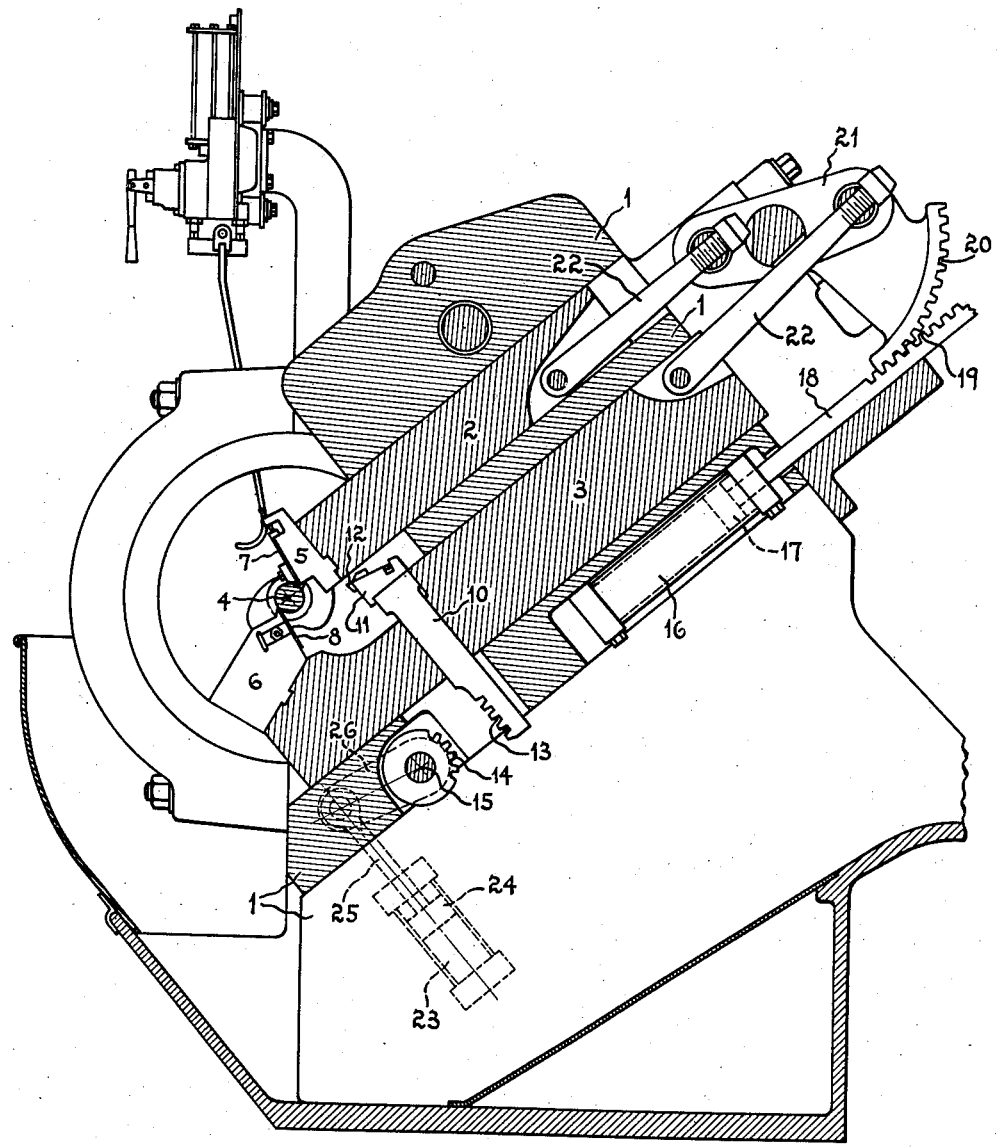
FIG. IV

2,356,997

UNITED STATES PATENT OFFICE 2,356,997

TOOL FEEDING MECHANISM

William F. Groene, Cincinnati, Ohio, assignor to The R. K. Le Blond Machine Tool Company, Cincinnati, Ohio, a corporation of Delaware Application September 16, 1940, Serial No. 356,993

7 Claims. (Cl. 82—9)

This invention pertains to tool feeding mechanism for lathes and is more particularly related to crankshaft lathes of a type, for example, shown in Patent Number 2,160,402, of William F. Groene, dated May 30, 1939, in which a plurality of tool feeding devices are arranged to approach and retract from the work piece or crankshaft to be machined in a predetermined sequential relationship, so as to perform combined roughing and finishing operations to complete the turning of the work piece. This invention is especially adapted to the application of a finishing tool feeding arrangement which operates in conjunction with the opposite reciprocatable roughing tool feeding devices of such lathes, as shown in the above cited patent.

One of the objects of this invention, is to provide in a lathe, having a pair of oppositely reciprocatable tool bars for feeding tools to perform roughing operations, a finishing tool feeding device which is carried by the tool bars and which is brought into cutting position by the retracting of the tool bars away from the work, so that power may be then applied to said finishing tool feeding device to complete the finish turning operations on the work piece after the roughing tools have completed their work and retracted to withdrawn position.

Another object of this invention is to provide in a crankshaft lathe, having a pair of oppositely reciprocatable tool bars with roughing tools for initially roughing out the work piece to be turned, a finishing tool feeding bar which is carried by one of the roughing tool feeding bars and movable in feeding motion in an angularly related or perpendicular direction relative to the tool bar feed of the tool bar upon which it is mounted.

Another object of this invention is to provide means for feeding a pair oppositely reciprocatable roughing tool bars to and from a work piece to be machined in the lathe, and then to provide a finishing tool feeding bar mounted on one of the roughing tool bars which is normally disconnected from feeding power during the cutting action of the roughing tools on the work piece, but which becomes automatically connected to the feeding power for the finishing tool feeding bar when the roughing tool bars have been moved to withdrawn position relative to the work piece and are held inoperative in said withdrawn position during the feeding motion of the finishing tool bar.

Further features and advantages of this invention will appear from the detailed description of the drawings in which:

Figure I is a right hand end enlarged fragmentary transverse section through a crankshaft lathe of a type, for example, shown in Patent Number 2,160,402, of William F. Groene, dated May 30, 1939, shown modified to accommodate the oppositely reciprocatable tool feeding bars and the unique finishing tool feeding bar carried by one of these roughing bars, all of the various tools being shown at the time of completion of the roughing operation, with the finishing tool feeding bar in retracted and inoperative position disconnected from the power feeding mechanism.

Figure II is a similar fragmentary transverse section through the lathe of Figure I showing the position of the roughing tool feeding bars in retracted position with the finishing tool feeding bar connected up with the power feed mechanism, but still in retracted position.

Figure III is also a similar fragmentary transverse section through the machine of Figure I, but showing the condition where the roughing tool feeding devices are in retracted position while the finishing tool feeding bar has been moved up with its cutting tools to complete the finish turning of the work piece.

Figure IV is a vertical transverse sectional view through the center drive crankshaft lathe showing the tool feeding mechanism for actuating the unique tool feeding arrangement of this invention.

This invention is shown applied to a typical crankshaft line bearing lathe of a type shown in the above mentioned patent which has a frame 1, in which are slidably mounted the tool feeding bars 2 and 3, which may be oppositely reciprocatable to and from a work piece W on the spindle 4 of the lathe, by suitable means as fully and clearly illustrated in the above mentioned patent comprising a main fluid pressure feed cylinder 16 having a piston 17 and piston rod 18 having a rack 19 which operates in the segmental gear 20 connected to the feed crankshaft 21 appropriately journaled in the frame 1 of the machine and having connecting rods 22 appropriately connected from the crankshaft 21 to the oppositely reciprocatable tool bars 2 and 3. On each of these tool bars are respectively mounted the tool blocks 5 and 6 which carry the roughing tools 7 and 8 for initially machining the work piece W, as these bars are fed to and from the work piece along the line of roughing tool feed 4a.

Appropriately slidably mounted on the surfaces 9 in the tool bar 3, is the finishing tool feeding bar 10, having a tool block 11 carrying the finishing tool 12 which is adapted to feed, in this particular illustration, perpendicular to the line of roughing tool feeding 4a, along the line of finishing tool feeding 4b as best shown in Figures II and III when the roughing tool bars 2 and 3 are moved to retracted position.

On the lower end of the finishing tool feeding bar 10, is formed a rack 13 which is adapted to engage in the gear 14, carried on the finishing tool feeding shaft 15 journaled in the frame 1 of the lathe and which shaft 15 is rocked in feeding motion by a suitable feed cylinder 23 having a piston 24 and piston rod 25 connected to a lever arm 26 fixed to the shaft 15, when the tool feeding bar 3 has been moved downwardly to the left in the figure to retracted position, so as to bring the rack 13 into proper mesh with the gear 14, as shown in Figure II. Suitable power means (not shown) of course, is provided for rotating the feeding shaft 15 for effecting the proper feeding motion in the finishing tool bar 10 so as to move it, as shown in Figure I, to the completed position shown in Figure III.

The operation of this arrangement is substantially as follows:

After the roughing tool feeding bars 2 and 3 have been fed to the work to complete the rough turning operation as shown in Figure I, by suitable apparatus as disclosed in the above mentioned patents, the tool bars are then withdrawn to retracted position as shown in Figure II, the result of which motion causes the rack 13 of the finishing tool bar 10 to properly engage itself with the gear 14 on the finishing feed shaft 15. As soon as this has been done by the full retraction of the roughing tool bars 2 and 3, as shown in Figure II, appropriate feeding power may then be applied to the shaft 15 to effect feeding of the finishing tool bar 10 to the position shown in Figure III, to cause its cutting tool 12 to feed along the line 4b which, in this instance, is substantially perpendicular to the line 4a of roughing tool feeding. I thus have here a unique and efficient combination of roughing and finishing tool feeding mechanism for a crankshaft lathe of the type above cited for efficiently providing the necessary roughing and finishing operations on a crankshaft in such a lathe, while at the same time providing compactness of construction and automatic operation of the various tool bars in proper sequential order without attention on the part of the operator.

Having thus fully set forth and described my invention what I claim as new and desire to secure by United States Letters Patent, is:

1. In a lathe; a frame; a pair of oppositely reciprocable tool feeding bars mounted in said frame; a series of roughing tools on said tool bars; means for effecting feeding motion in said tool bars for simultaneously presenting said roughing tools to a work piece in said lathe; a finishing tool feeding bar, movably mounted on one of said roughing tool feeding bars for feeding movement in a direction angularly related to the direction of feeding movement of said roughing tool bars, presentable to and from cutting position relative to said work piece by the movement of said one roughing tool bar; a cutting tool on said finishing tool feeding bar; and means on said frame for feeding said finishing tool feeding bar relative to said work piece when said roughing tool feeding bars are in retracted position relative to said work piece.

2. In a lathe; a frame; a pair of oppositely reciprocatable tool feeding devices; cutting tools on said devices; means for moving said devices so as to effect feeding motion of said cutting tools relative to a work piece in said lathe; a third tool feeding device, movably mounted for feeding movement on one of said first mentioned tool feeding devices in a direction angularly related to the direction of movement of said first mentioned tool feeding devices, presentable to or from cutting position in said lathe by the movement of said one of said first mentioned tool feeding devices and means on the frame of said lathe for actuating said third tool feeding device in feeding movement.

3. In a lathe; a frame; a tool feeding device movably mounted in said frame; cutting tools mounted on said device; means on said frame for moving said device to effect feeding motion of said cutting tools relative to a work piece in said lathe; a second tool feeding device, movably mounted for feeding movement on said first mentioned tool feeding device in a direction angularly related to the direction of movement of said first mentioned tool feeding device, presentable to or from cutting position in said lathe by the movement of said first mentioned tool feeding device; and means on the frame of said lathe for actuating said second tool feeding device in feeding movement.

4. In a lathe; a frame; a pair of oppositely reciprocatable tool feeding devices; cutting tools on said devices; means for moving said devices so as to effect feeding motion of said cutting tools to and from a work piece in said lathe; a third tool feeding device, movably mounted on one of said pair of tool feeding devices for feeding movement in a direction angularly related to the direction of feeding movement of said pair of tool feeding devices, presentable to and from cutting position relative to said work piece by the movement of said one of said pair of oppositely reciprocatable tool feeding devices; means on the frame of said lathe for effecting feeding motion of said third tool feeding device; and means for connecting said third tool feeding device to said means for effecting said feeding motion therein when said pair of tool feeding devices are retracted from said work piece and for disconnecting said third tool feeding device from said tool feeding mechanism therefor when said pair of tool feeding devices is fed to said work piece in said lathe.

5. In a lathe; a frame; a pair of of oppositely reciprocatable tool bars movably mounted in said frame; means for feeding said tool bars; tool holders on said tool bars; tools carried in said tool holders arranged for movement to and from a work piece in said lathe; a third tool feeding bar movably mounted on one of said pair of tool bars, for feeding movement in a direction substantially perpendicular to the direction of feeding movement of said pair of tool bars, presentable to and from cutting position relative to said work piece by the movement of said one of said pair of tool bars; a cutting tool mounted on said third tool feeding bar; and means in said frame of said lathe for actuating said third tool feeding bar.

6. In a lathe; a frame; a pair of oppositely reciprocatable tool bars movably mounted in said frame; means for feeding said tool bars; tool holders on said tool bars; tools carried in said tool holders arranged for movement to and from a work piece in said lathe; a third tool feeding bar movably mounted on one of said pair of tool bars for feeding movement in a direction substantially perpendicularly related to the direction of feeding movement of said pair of tool bars, presentable to and from cutting position relative to said work piece by the movement of one of said pair of tool bars; a cutting tool mounted on said third tool feeding bar; means including a gear carried in said frame of said lathe for actuating said third tool feeding bar; a rack on said third tool feeding bar adapted to engage said gear when said one of said pair of tool feeding bars is moved to retracted position from said work piece in said lathe.

7. In a lathe; a frame; a pair of oppositely reciprocatable tool bars movably mounted in said frame; means for feeding said tool bars; tool holders on said tool bars; tools carried in said tool holders arranged for movement to and from a work piece in said lathe; a third tool feeding bar, movably mounted on one of said pair of tool feeding bars for feeding movement in a direction substantially perpendicular to the direction of feeding movement of said pair of bars, presentable to and from cutting position relative to said work piece by the movement of said one of said pairs of bars; a cutting tool mounted on said third tool feeding bar; means including a gear carried in said frame of said lathe for actuating said third tool feeding bar; and means comprising a rack on said third pair tool feeding bar adapted to engage said gear when said oppositely reciprocatable tool feeding bars are retracted from the work piece in said lathe and adapted to withdraw from said gear when said pair of tool feeding bars is moved toward said work piece.

WILLIAM F. GROENE.